United States Patent
Hahn et al.

(10) Patent No.: US 6,188,949 B1
(45) Date of Patent: Feb. 13, 2001

(54) METHOD AND ARRANGEMENT FOR CONTROLLING THE LONGITUDINAL VELOCITY OF A MOTOR VEHICLE

(75) Inventors: Stefan Hahn, Ulm/Donau; Friedemann Kuhn, Fellbach; Rudolf Lorenz, Ebersbach; Klaus Mezger, Stuttgart, all of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/312,893

(22) Filed: May 17, 1999

(30) Foreign Application Priority Data

May 15, 1998 (DE) .............................. 198 21 803

(51) Int. Cl.⁷ .............................. B60T 8/32; G05D 1/00; G06F 17/00
(52) U.S. Cl. .............................. 701/93; 701/96; 701/110; 180/170
(58) Field of Search .............................. 701/93, 110, 96, 701/91, 200; 180/170

(56) References Cited

U.S. PATENT DOCUMENTS

| | | | |
|---|---|---|---|
| 5,161,634 | * 11/1992 | Ichihara et al. | 180/179 |
| 5,260,876 | * 11/1993 | Oo et al. | 701/93 |
| 5,390,756 | * 2/1995 | Yokoyama | 180/178 |
| 5,396,426 | * 3/1995 | Hibino et al. | 701/96 |
| 5,479,349 | * 12/1995 | Katayama | 701/93 |
| 5,581,465 | * 12/1996 | Adler et al. | 701/110 |
| 5,689,422 | * 11/1997 | Heymann et al. | 701/93 |
| 5,774,820 | * 6/1998 | Linden et al. | 701/93 |
| 6,098,007 | * 8/2000 | Fritz | 701/93 |

FOREIGN PATENT DOCUMENTS

| | | |
|---|---|---|
| 33 08 803 | 9/1984 | (DE) . |
| 38 17 495 | 11/1989 | (DE) . |
| 195 06 364 | 8/1995 | (DE) . |
| 196 36 572 | 3/1997 | (DE) . |
| 197 01 370 | 7/1997 | (DE) . |
| 0 188 455 | 7/1986 | (EP) . |
| WO 88/05199 | 7/1988 | (WO) . |
| WO 93/17406 | 9/1993 | (WO) . |

* cited by examiner

*Primary Examiner*—William A. Cuchlinski, Jr.
*Assistant Examiner*—Olga Hernandez
(74) *Attorney, Agent, or Firm*—Evenson, McKeown, Edwards & Lenahan, P.L.L.C.

(57) ABSTRACT

A method and arrangement for controlling the longitudinal velocity of a motor vehicle is provided with a continuous determination of the vehicle position and controlling of the longitudinal velocity while defining a desired velocity defining value and/or velocity defining limit value as a function of the determined vehicle position. By using corresponding velocity defining devices, velocity data are detected by way of the actual value and/or a set desired value and/or a set limit value of the longitudinal vehicle velocity as a function of the vehicle position. The desired velocity defining value and/or velocity defining limit value is determined from the velocity data detected for the respective vehicle position during one or several preceding drives. The detected velocity data themselves and/or the desired defining value data or defining limit value data are stored in a retrievable manner.

30 Claims, 1 Drawing Sheet

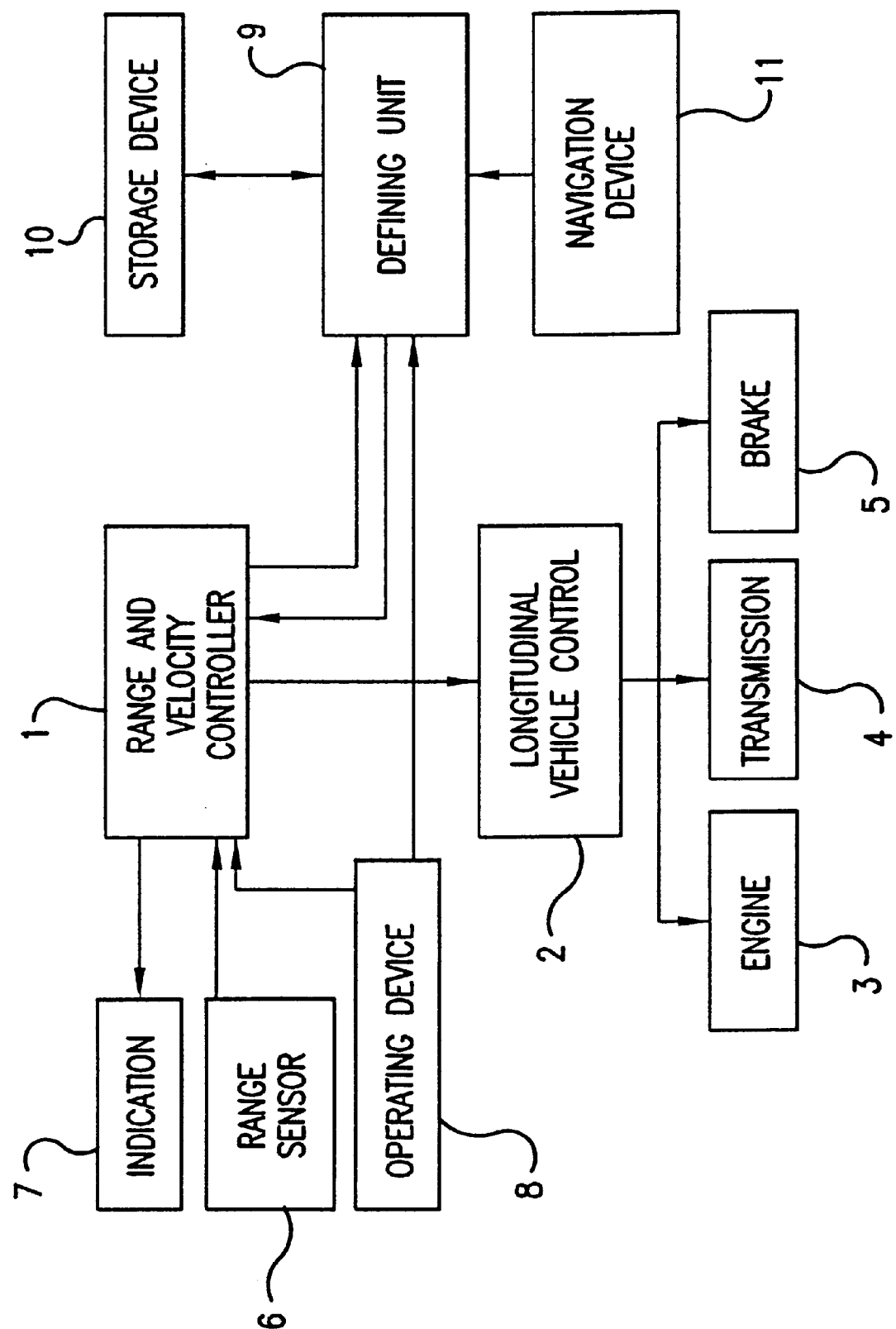

METHOD AND ARRANGEMENT FOR CONTROLLING THE LONGITUDINAL VELOCITY OF A MOTOR VEHICLE

BACKGROUND AND SUMMARY OF THE INVENTION

This application claims the priority of German Application No. 198 21 803.6, filed May 15, 1998, the disclosure of which is expressly incorporated by reference herein.

The invention relates to a method and arrangement for controlling the longitudinal velocity of a motor vehicle. By means of corresponding devices, the vehicle position is determined and a desired velocity defining value and/or a velocity defining limit value is indicated as a function of the determined vehicle position for the longitudinal velocity control. In the present case, the term "control", is used broadly to also include automatic controls.

Methods and arrangements of this type are known in various embodiments. Thus, in the case of a system disclosed in International Published Patent Application WO 88/05199, in addition to geographical data of an electronic road map, safety-relevant data, which, among other things, are also relevant to the control of the longitudinal velocity, are previously stored and are retrieved when driving on the corresponding route sections. In the case of systems as described in German Published Patent Applications DE 42 01 142 A1, DE 195 02 954 A1 and International Published Patent Application WO 93/17406, as well as German Patent Document DE 195 06 364 C2, desired velocity value and/or velocity limit value data relevant to the longitudinal velocity control are determined from the geometrical data of a digitally stored road system map. In particular, it is suggested in the above-mentioned German Patent Document DE 195 02 954 A1 to determine and store specific route-dependent characteristic values concerning the course of the route, such as turns, radii of turns and yaw angle values, when driving a route for the first time which will be subsequently traveled frequently. In the case of an active automatic velocity control, the driver must then define a first desired velocity value and, by means of the stored characteristic values, the system will determine a pertaining second desired velocity value which is compared with the first. Based on the comparison, the lower of the two will be used as the actual desired velocity value.

From German Patent Document DE 34 38 385 C2 and European Patent Document EP 0 188 455 B1, systems are known in which such longitudinal-velocity-relevant data, particularly with respect to defining velocity limit values, can be indicated by storage units arranged on the route-side and can be read by corresponding vehicle-side read units. Another system of this type is disclosed in German Published Patent Application DE 33 08 803 A1, where, in addition, a vehicle-specific coded identification card is provided. The various driving conditions of the motor vehicle can be programmed into the card in a free or fixed manner, such as a maximal driving speed or a maximal longitudinal or lateral acceleration. This is to have the effect that, among other things, the maximum possible driving speed can be adapted to the external conditions and to the driver's driving capability.

German Patent Document DE 38 17 495 C2 discloses a system in which data relative to the respective user with respect to electronically controllable functions of a motor vehicle are stored in a retrievable manner in user-individually assigned storage units. To the extent that the electronically controllable functions concern those for a transmission line and therefore longitudinal-velocity-relevant functions, it is suggested that the respective vehicle handling of the concerned user be continuously monitored, be assigned to one of several definable vehicle handling categories, and that the assignment to the respective category be stored. The storage units can be housed in user-side electronic key units which are part of the vehicle.

The invention is based on the technical problem of providing a method and arrangement of the above-mentioned type which permit an advantageous new longitudinal velocity control, particularly for repeatedly driven routes.

The invention solves this problem by providing a method for controlling the longitudinal velocity of a motor vehicle, wherein the vehicle position is determined and a desired velocity defining value and/or a velocity defining limit value is defined for controlling the longitudinal vehicle velocity as a function of the determined vehicle position. Velocity data are detected by way of the actual value and/or a set desired value and/or a set limit value of the vehicle longitudinal velocity as a function of the vehicle position. The desired velocity defining value and/or velocity defining limit value is determined from the velocity data detected for the respective vehicle position during one or several preceding drives. The detected velocity data themselves and/or the data concerning the desired velocity defining value and/or velocity defining limit value determined therefrom are stored in a retrievable manner. An arrangement for solving the prior art problems controls the longitudinal velocity of the motor vehicle and includes vehicle position determining devices, and longitudinal velocity control devices for controlling the longitudinal velocity of the vehicle according to a desired velocity defining value and/or velocity defining limit value defined as a function of the vehicle position. The longitudinal velocity control devices comprise velocity defining devices which detect velocity data by way of the actual value and/or a set desired value and/or a set limit value of the longitudinal velocity as a function of the vehicle position and determine the desired velocity defining value and/or the velocity defining limit value from the velocity data detected for the respective vehicle position during one or several preceding drives. The velocity defining devices contain storage devices for storing the detected velocity data themselves and/or the desired defining value data or defining limit value data determined therefrom.

In the case of the method according to the invention, velocity data are detected in the continuous driving operation by way of the actual value and/or a set desired value and/or a set limit value of the longitudinal vehicle velocity as a function of the vehicle position, and the desired defining value and/or the defining limit value for the longitudinal velocity control is determined from the velocity data recorded for the respective vehicle position during one or several previous drives. The arrangement according to the invention is suitable for implementing this method.

In a memory-type manner, this approach utilizes the actual velocity selected by the driver in the past on a respective route section and/or the desired velocity and/or the limit velocity, while storing this information, for deriving and defining a suitable desired value and/or limit value for the longitudinal velocity control when again driving on the concerned route section. The individual devices used for this purpose are familiar as such to a person skilled in the art, for example, from conventional navigation and range control systems, particularly suitable vehicle position determining devices, longitudinal velocity control devices, such as those which automatically intervene in the transmission line and/or the braking system, and data storage devices for recording relevant data. Characteristically, correspondingly designed defining devices are provided which obtain from the detected velocity data the desired velocity defining value and/or the velocity defining limit value for the respectively just driven route section and indicate this value to the velocity control devices, at least in the form of corresponding information for the vehicle driver and preferably in the form of desired-value signals or limit signals which are fed directly to a device for the automatic longitudinal velocity control. By means of such an automatic control device, a memory-aided longitudinal velocity control can be implemented which is largely independent of the vehicle driver. The limit value or desired value changes occurring when the stored data are retrieved can be indicated to the driver by suitable visual, haptic or acoustic devices.

In a preferred embodiment of the method, the storing of the velocity data and the indicating of the desired velocity defining value and/or of the velocity defining limit value takes place as a function of one or several different velocity influencing variables continuously sensed during the drive. Such variable influences are, for example, the speed of the traffic driving ahead, the weather, changing traffic signs and light signal systems. By taking into account these influential variables avoids the situation where indication of the desired velocity defining value and/or of the velocity defining limit value during a drive takes place by means of velocity data which were recorded previously during a drive under completely different conditions. On the contrary, the data are then used in a targeted manner for this purpose which were previously recorded under the same or at least largely the same conditions.

A system further developed according to the invention is suitable for implementing this method, for the purpose of which it particularly contains the required sensor devices for detecting the influential velocity variables taken into account.

In the case of a further preferred method, a first special type of defining the desired velocity defining value and/or the velocity limit value is provided. Here, an actual velocity value or a desired velocity value or a velocity limit value are used, as detected during an earlier drive for the corresponding vehicle position, in a driver-commanded manner; that is, upon a corresponding triggering command by the vehicle driver. An arrangement further developed according to the invention is suitable for implementing this method, in that its defining devices are designed correspondingly.

A method further developed according to the invention contains a second advantageous manner of defining the desired velocity defining value and/or the velocity defining limit value by utilizing the actual velocity value last driven at the corresponding point or the adjusted desired velocity value or velocity limit value. An arrangement further developed according to the invention by means of a corresponding system design is suitable for implementing this method.

A method further developed according to the invention contains a third advantageous manner of defining the desired velocity defining value. Here, the actual velocity value is used which last existed at the respective point when driving on a free road; that is, without any influence on the longitudinal velocity by a vehicle driving ahead, for example, within the scope of a ranging control, whether because of an automatic velocity control phase or by a defining of the velocity by the driver. For this purpose, the criterion of a free-road drive is appropriately detected, for example, by detecting and evaluating the distance to the vehicle driving ahead while the driving velocity is known. An arrangement further developed according to the invention, which, particularly for this purpose, has devices for recognizing the condition of a free-road drive, is suitable for implementing this method.

In the case of a method further developed according to the invention, it is provided as another advantageous possibility to determine the desired velocity defining value or velocity defining limit value as a selectable percentage value from several values of the actual velocity detected during preceding drives or from the desired velocity or the limit velocity. Here, the actual or desired or limit velocity values of all preceding drives or classified according to the mentioned different influential velocity variables, are taken into account, particularly regarding the existence of the condition of a free-road drive. For implementing this method, an arrangement further developed according to the invention is suitable, for the purpose of which particularly its defining devices are designed appropriately.

In the case of a further preferred method according to the invention, for route sections for which there are not yet any evaluatable velocity data of a previous drive, the desired velocity defining value and/or velocity defining limit value are derived from desired velocity or limit velocity defining data stored beforehand for the considered road network, specifically for the route, or are derived implicitly from the geometrical data of a stored road network itself. As a result, also for the case of a first-time driving of a route section, a useful desired value or limit value definition can be provided for the longitudinal velocity control. For implementing this method, an arrangement is suitable which is further developed according to the invention and which, for this purpose, contains velocity data and road network data which, in a particularly suitable manner, were stored beforehand in storage devices.

In another preferred method according to the invention, it is possible to provide for a respective vehicle position several parallel rough defining values from velocity data detected during previous drives and optionally velocity data explicitly filed beforehand relative to the route or implicitly determined from geometrical road network data. From these, according to a definable priority list the respective highest-priority existing rough value is selected as the desired velocity defining value or speed defining limit value. For implementing this method, an arrangement further developed according to the invention is suitable, for the purpose of which particularly its defining devices have a suitable design.

In yet another preferred method according to the invention, a driver-specific or transferrable selection of the route-dependent desired velocity defining value or velocity defining limit value is provided. This is done so that a velocity profile for the longitudinal vehicle velocity which is specific to each driver of a vehicle or can be transferred to various vehicles is available for each driver of a vehicle. For implementing this method, an arrangement is suitable which is further developed according to the invention and which, for this purpose, has storage areas or storage units which are separate with respect to the driver and arranged on the vehicle side or, as an alternative, driver-side storage units which are housed in electronic keys or the like or storage units outside the vehicle which can be used in different vehicles.

Other objects, advantages and novel features of the present invention will become apparent from the following detailed description of the invention when considered in conjunction with the accompanying drawings.

BRIEF DESCRIPTION OF THE DRAWING

The single FIGURE is a block diagram of an arrangement for controlling the longitudinal velocity of a motor vehicle which comprises a velocity memory functionality according to the invention.

DETAILED DESCRIPTION OF THE DRAWING

The arrangement schematically illustrated in FIG. 1 as a block diagram can be used, for example, in road vehicles. It contains, on the one hand, a conventional device for an automatic range and velocity control, also called ranging cruise controls. This ranging cruise control comprises a range and velocity controller 1; a unit 2 for controlling the longitudinal vehicle velocity which can be triggered by the latter and which, in turn, has a longitudinal-velocity-controlling effect on the operation of an engine 3, the shifting of a transmission 4 and the operation of a braking system 5; a range sensor 6 for detecting the distance to vehicles driving ahead; a visual and/or acoustic indicating unit 7 for indicating the momentary condition of the range and velocity control; as well as an operating unit 8, by which the driver of the vehicle can activate and deactivate the range and velocity controller 1 and can define desired values for it, particularly a desired velocity and/or a desired upper speed limit and/or a desired range value. In the case of an activated range and velocity control device 1 to 8, the latter is capable of automatically guiding the vehicle such that specific distances to vehicles driving ahead and/or defined desired or limit velocity values for the longitudinal velocity and, as required, also for the lateral velocity are maintained. A plurality of various types of such range and velocity control devices are known, to which reference is made with respect to further details.

On the other hand, the illustrated arrangement characteristically comprises devices for implementing a velocity memory functionality in order to be able to define desired and/or limit velocity values as a function of the momentary vehicle position for the range and velocity control device based on velocity data which were recorded during one or several preceding drives on the same driving route. These devices comprise a computer unit in the form of a (velocity) defining unit 9, storage devices 10 which can be connected to it, and a navigation device 11 of a conventional construction.

The navigation device 11 continuously detects the vehicle position, for example, by means of a GPS receiver, and supplies navigation information to the driver, for example, route recommendations for reaching a desired destination. For this purpose, the navigation device contains the road network, which can be driven by the vehicle, in a digitally stored form. The navigation device 11 can naturally be replaced by any other conventional vehicle position determination device. In this case, the vehicle position determination devices must not necessarily be able to identify the current vehicle position as a geodetic coordinate or position on a stored digital road map. It is sufficient that they are capable of recognizing a once driven route. This can be achieved in a simple manner also, for example, by storing and comparing the curvature profile of a respective stored route, perhaps estimated from the signals of a yaw rate sensor, rotational wheel speed differences or the steering wheel angle, so that the memory function can be implemented in a simple manner also without a complete navigation system. In every case, the defining unit 9 receives the information concerning the momentary vehicle position on a once driven route.

The defining unit 9 controls the detection of the required velocity data during a drive and the storage of these data or of desired velocity values and/or velocity limit value data derived therefrom in the storage devices 10. The defining unit 9 also controls the retrieval of these data for the purpose of defining corresponding desired velocity defining values and/or velocity defining limit values for the range and speed control device. By means of the operating device 8, the driver can trigger the defining unit 9 for starting and ending such data recording and data retrieving processes. For triggering the data recording and data retrieving functionalities of the defining unit 9, the operating device 8 preferably contains an operating module with obvious symbols familiar from magnetic recording devices, such as tape and cassette recorders, spatially adjacent to operating elements for the range and velocity controller 1.

The defining unit 9 receives from the range and velocity controller 1 the required longitudinal-velocity-relevant data, particularly according to the system design, the desired longitudinal velocity value momentarily set at the controller 1 and/or a set upper longitudinal velocity limit value, that is, a momentarily maximum permissible longitudinal velocity. In addition, the defining unit 9 receives from the range and velocity controller 1 information concerning the momentary range value of the range control. From it, the defining unit 9 recognizes whether its vehicle is following at a controlled distance a vehicle driving ahead or whether a condition of a free-road drive exists, that is, there is no vehicle driving ahead. The criterion of a free-road drive or a drive in which the road is not free forms an influential variable according to which the velocity-relevant data are separately evaluated, stored and received in the defining unit 9. This takes into account the fact that a desired velocity value set by the range control at a certain point if the road is not free is not necessarily very suitable as a defining value for a later drive along the same point if, at this later point in time, the road is free. For this purpose, the criterion of the free-road drive is appropriately detected, for example, by sensing and evaluating the distance from the vehicle driving ahead when the driving velocity is known. According to the requirements, additional influential variables can be sensed and taken into account by the defining unit 9 in a conventional manner not shown in detail, such as the weather by means of a rain or tire friction value sensor system or the presence and the indicating condition of changing traffic signs and/or light signal systems. The entire set of influential variables is divided into classes, and the defining unit 9 carries out the evaluation, storage and retrieval of the data required for fulfilling its velocity memory functionality separately for each of these classes.

When the data recording functionality is activated, the defining unit 9 determines via the navigation device 11 the momentary vehicle position and via the corresponding sensor devices, the momentary values of the influential variables and thus their momentarily relevant class. The defining unit 9 stores in the storage devices 10 the desired value and/or limit value information for the momentary vehicle location supplied to it by the range and velocity controller 1 and the momentary influential variable class.

When the data retrieving and velocity defining functionality is activated, the defining unit 9 again determines the vehicle position and the momentarily relevant class of the influential variables; retrieves from the storage devices 10 the velocity data recorded beforehand for the determined vehicle position and the determined class of the influential variables; and determines therefrom a desired velocity defining value and/or velocity defining limit value which it then emits as corresponding setting recommendations to the range and velocity controller 1. The latter takes into account the desired and/or limit value recommendations derived from one or several previous drives for controlling the longitudinal velocity of the vehicle. As an alternative to the direct storage of velocity data recorded during the drive and their evaluation for obtaining desired and/or limit velocity recommendations, it may be provided to carry out this evaluation immediately when sensing the velocity data and to store the thus obtained desired defining values and or defining limit values in order to retrieve them during a later drive from the storage devices 10 and supply them directly to the range and velocity controller 1.

As an alternative or in addition to the described direct detection of variable velocity influences, the defining unit 9 may take into account recorded velocity data of several preceding drives for determining the desired defining values and/or defining limit values; for example, in that it derives the defining values by means of a statistical method from several preceding drives. For example, the defining value can be set to be equal to a percentage value, for example, 90%, below which the corresponding fraction of previously recorded velocity values fall.

The defining unit 9 preferably operates in a personalized manner; that is, it is designed such that it carries out the recording and defining of velocity data for each driver separately. This is done so that the velocity recommendations of the defining unit 9 to the range and velocity controller 1 take place for each driver according to his personal velocity profile which is obtained from the velocity data recorded for him to date. The recognition of the respective driver can take place in one of the conventional manners automatically, for example, by using so-called keyless entry systems, or a corresponding adjusting unit is provided on which the driver can select his velocity profile. The storing of the velocity data for the different drivers can take place in different vehicle-side storage areas of the storage devices 10. As an alternative, the storage devices 10 contain individual storage units accommodated in electronic keys carried along by the different vehicle users, in which storage units the velocity data of one driver respectively are stored. In the case of this personalized system design, it is also possible to intentionally design the longitudinal velocity control differently for the various vehicle users, in that, for example, the vehicle owner is enabled to limit the maximum velocity individually for certain users of his vehicle on certain routes. Optionally, a protection of the recorded velocity data is also provided with respect to unauthorized use; for example, by means of a password protection for the operation of the defining unit 9 similar to a conventional antitheft protection for car radios. This unauthorized usage protection can be activated depending on the system design upon request or when an accident situation is detected.

As required, the recorded defining data, which represent a certain driving profile for a given route, may be stored in such a manner that they are transferrable and/or accessible to processing. Thus, for example, the storage can take place on a mobile data carrier, such as an electronic key, or in keyless entry systems which contain a driving authorization for several vehicles. In this case, the driver can take over the defining data recorded by means of a preceding drive for the later driving of this route by means of a different arbitrary vehicle, in which case the driver can naturally also change. With respect to ensuring such a transfer capacity and simultaneous limitation of the vehicle-side storage requirement, it may also be advantageous to store the defining data in an external data bank, for example, via the Internet, which the vehicle can access by way of suitable conventional communication devices, such as a mobile radio telephone service. If desired, it can be provided that the stored defining data can be reprocessed by means of a personal computer. As the result of this flexible storage of the defining data, which can be achieved in one fashion or another, a vehicle owner, for example, a taxi owner or forwarding agent, is able to provide or define to the users of his vehicles under, for example, consumption-optimal aspects previously recorded velocity profiles for a route to be driven by means of the stored defining values.

Several possibilities exist for determining the desired defining values or defining limit values as a recommendation of the defining unit 9 to the range and velocity controller 1 as a function of the vehicle position and thus of the driving route driven by the vehicle. According to the requirements, one or several of these possibilities can be implemented in the defining unit 9. If several possibilities are implemented in parallel, their prioritization can be provided in the defining unit 9. Here, the highest-priority possibility is always selected if recorded data exist for this purpose from one or several preceding drives. In the following, several such possibilities will be explained as examples. All or only some of these possibilities can be provided in parallel. Preferably, a respective previously mentioned possibility of a higher priority will then be used rather than that of a subsequently mentioned possibility.

A first possibility consists of the fact that, explicitly by the input of a corresponding control command on the operating device 8, the driver triggers the recording of the desired velocity value and/or the velocity limit value currently set at the range and velocity regulator 1. These recorded, location dependent velocity values are used as desired defining values or defining limit values when subsequently driving the same route.

In the case of a second possibility, the actual value of the longitudinal velocity of the vehicle will be recorded during the drive upon the driver's command and will be used as a desired defining value during a later drive. The recording of these data preferably takes place as a function of the criterion of a free road drive or of a drive on a road which is not free, which is appropriately monitored for this purpose.

In the case of a third possibility, without any explicit driver's command, the desired velocity or limit velocity last set by the driver at the respective vehicle location is used as a desired defined value or defined limit value for the current drive.

In the case of a fourth possibility, it is provided to select as the desired defining value or defining limit value the 90% value from several desired values or limit values previously recorded for the corresponding route section and set by the driver. By means of this approach, variable influences are taken into account in a statistical manner and it is prevented that atypical desired or limit values selected in special exceptional situations are maintained as defining values for the next drive.

In the case of a fifth possibility, the detection of the condition of a free-road drive is used in that the desired value is used as the desired defining value which was last detected and stored when driving the corresponding route section for a case in which the condition of a free-road drive had existed. The ranging cruise control takes over this defining value for the current drive as a location-dependent desired value in the operating phases of a free-road drive in which it does not control the longitudinal velocity such that a vehicle driving ahead is followed at a constant distance.

In the case of a sixth possibility, analogously to the fourth possibility, not the desired value which last existed during a free-road drive at the corresponding location is selected as the desired defining value but rather the 90% value of all desired values previously set during drives on a free road at this location and recorded.

In the case of a seventh possibility, the actual velocity is recorded which last existed at the corresponding location and is used as a desired defining value for the next drive of this route section.

In a variant thereof, as an eighth possibility analogously to the fourth possibility, not the last driven actual velocity but rather the 90% value of all actual velocities previously driven at this location is selected as the desired defining value for the current drive.

Since, during a first-time drive of a route, no recorded velocity data exist from previous drives for the corresponding route section, it is provided as a ninth possibility to store beforehand, as a function of the location together with digital road network maps, explicitly pertaining desired defining values and/or defining limit values for the longitudinal velocity. These values are used for the current drive at least to the extent in which data of preceding drives recorded in a driver-specific manner do not yet exist.

As a variant, it is provided according to a tenth possibility to derive to this extent such desired defining values and/or defining limit values of the vehicle longitudinal velocity for the first-time driving of a route implicitly from route-specific data of a digitally stored road network map, particularly as a function of the road classification, through-town driving and turns in the road.

The above explanations demonstrate that the ten above-mentioned possibilities become less and less driver-specific in the sequence given. In order to save storage space, it is sufficient to store only the velocity data for the possibility which is in each case implemented most specifically and to retrieve it when the route is driven again. The fourth, sixth and eighth implementation variants permit a comfortable velocity defining action which is relatively independent of individual events, in which case, instead of the above-mentioned 90% value a different percentage can naturally also be used. The above-mentioned first possibility is particularly easy to implement, in which the driver needs to explicitly store only the desired value and/or limit value desired by him. This represents a variant which is particularly easily understandable and can be implemented at minimal storage expenditures. It is understood that any other combination of the above-mentioned possibilities can be used for the implementation of the velocity defining functionality within the scope of the method according to the invention and the arrangement according to the invention, as defined in the attached claims.

It will readily be understood that the method and arrangement for controlling the longitudinal velocity of the motor vehicle operates in accordance with the above description via microprocessor based control units. These control units are appropriately programmed in order to perform the above-described methods.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a longitudinal velocity of a motor vehicle, wherein a vehicle position is determined and a desired velocity defining value and/or a velocity defining limit value is defined to control the longitudinal vehicle velocity as a function of the determined vehicle position, the method comprising the acts of:

detecting velocity data by way of at least one of an actual value, a set desired value, and a set limit value of the vehicle longitudinal velocity as a function of the determined vehicle position;

determining at least one of a desired velocity defining value and velocity defining limit value from the velocity data detected for the determined vehicle position during one or more preceding drives; and storing in a retrievable manner at least one of the detected velocity data, data concerning the desired velocity defining value and data concerning the velocity defining limit value determined from the detected velocity data.

2. Method according to claim 1, further comprising the act of using an actual velocity value detected previously for the corresponding vehicle position at the driver's command or a desired velocity value or limit velocity value for defining the desired velocity defining value and/or velocity defining limit value.

3. Method according to claim 1, further comprising the act of using an actual velocity value last detected for the corresponding vehicle position or a desired velocity value or limit velocity value for defining the desired velocity defining value and/or velocity defining limit value.

4. Method according to claim 1, further comprising the act of using an actual velocity value last sensed on a free-road drive for the corresponding vehicle position for defining the desired velocity defining value.

5. Method according to claim 1, further comprising the act of using a definable percentage value of several actual velocity values detected for the corresponding vehicle position during previous drives or desired velocity values as a whole or selectively only of those during a free-road drive or limit velocity values, for defining the desired velocity defining value and/or velocity defining limit value.

6. Method according to claim 1, further comprising the act of using defining values explicitly stored beforehand as a function of the route or defining values implicitly determined from data of a digitally stored road network map for route sections for which evaluatable sensed velocity data from a previous drive do not yet exist, for defining the desired velocity defining value and/or velocity defining limit value.

7. Method according to claim 1, further comprising the act of using one, respectively, of several rough defining values which are obtained in parallel by a different evaluation of detected velocity data of preceding drives and/or of velocity data explicitly stored beforehand or implicitly derived from road network data stored beforehand, according to a definable priority list for defining the desired velocity defining value and/or velocity defining limit value.

8. Method according to claim 1, wherein the act of detecting the velocity data and/or the defining of the desired velocity defining value and/or velocity defining limit value takes place in a user-specific and/or transferrable manner.

9. Method according to claim 1, wherein the act of storing in a retrievable manner the detected velocity data and the data concerning the desired velocity defining value and/or the velocity defining limit value takes place in a classified manner as a function of one or several sensed influential velocity variables.

10. Method according to claim 9, further comprising the act of using an actual velocity value detected previously for the corresponding vehicle position at the driver's command or a desired velocity value or limit velocity value for defining the desired velocity defining value and/or velocity defining limit value.

11. Method according to claim 9, further comprising the act of using an actual velocity value last detected for the corresponding vehicle position or a desired velocity value or limit velocity value for defining the desired velocity defining value and/or velocity defining limit value.

12. Method according to claim 9, further comprising the act of using an actual velocity value last sensed on a free-road drive for the corresponding vehicle position for defining the desired velocity defining value.

13. Method according to claim 9, further comprising the act of using a definable percentage value of several actual velocity values detected for the corresponding vehicle position during previous drives or desired velocity values as a whole or selectively only of those during a free-road drive or limit velocity values, for defining the desired velocity defining value and/or velocity defining limit value.

14. Method according to claim 9, further comprising the act of using defining values explicitly stored beforehand as a function of the route or defining values implicitly determined from data of a digitally stored road network map for route sections for which evaluatable sensed velocity data from a previous drive do not yet exist, for defining the desired velocity defining value and/or velocity defining limit value.

15. Method according to claim 9, further comprising the act of using one, respectively, of several rough defining values which are obtained in parallel by a different evaluation of detected velocity data of preceding drives and/or of velocity data explicitly stored beforehand or implicitly derived from road network data stored beforehand, according to a definable priority list for defining the desired velocity defining value and/or velocity defining limit value.

16. An arrangement for controlling a longitudinal velocity of a motor vehicle, comprising:
vehicle positioning determining devices to determine a vehicle position;
longitudinal velocity control devices which control the longitudinal velocity of the vehicle according to at least one of a desired velocity defining value and a velocity defining limit value defined as a function of the determined vehicle position;
wherein said longitudinal velocity control devices comprise velocity defining devices which detect velocity data by way of at least one of an actual value, a set desired value, and a set limit value of the longitudinal velocity as a function of the determined vehicle position, said velocity defining devices determining at least one of the desired velocity defining value and the velocity defining limit value from the velocity data detected for a respective vehicle position during one or more preceding drives; and
further wherein said velocity defining devices contain storage devices which store the detected velocity data itself and/or the desired defining value data or defining limit value data determined from the detected velocity data.

17. Arrangement according to claim 16, wherein the velocity defining devices for defining the desired velocity defining value and/or the velocity defining limit value use an actual velocity value detected beforehand upon a driver's command for the corresponding vehicle position or the desired velocity value or the velocity limit value.

18. Arrangement according to claim 16, wherein the velocity defining devices use an actual velocity value last recorded for the corresponding vehicle position or a desired velocity value or limit velocity value for defining the desired velocity defining value and/or velocity defining limit value.

19. Arrangement according to claim 16, wherein the velocity defining devices contain devices for recognizing the condition of a free-road drive and use an actual velocity value last detected during a free-road drive for the corresponding vehicle position for defining the desired velocity defining value.

20. Arrangement according to claim 16, wherein the velocity defining devices use a definable percentage value from several actual velocity values detected beforehand for the corresponding vehicle position as a whole or only during a free-road drive, or desired velocity values or limit velocity values for defining the desired velocity defining value and/or velocity defining limit value.

21. Arrangement according to claim 16, wherein the velocity defining devices use defining values stored beforehand and/or defining values determined from road network data stored beforehand as long as no detected velocity data of previous drives are available in an evaluatable manner for the respective driving position, for defining the desired velocity defining value and/or velocity defining limit value.

22. Arrangement according to claim 16, wherein the velocity defining devices select the desired velocity defining value and/or velocity defining limit value according to a definable priority list from several rough defining values which they determine in parallel from road network data stored beforehand and/or from defining values explicitly stored beforehand.

23. Arrangement according to claim 16, wherein the velocity defining devices carry out the detecting of the velocity data and the defining of the desired velocity defining value and/or velocity defining limit value in a driver-specific and/or transferrable manner, and wherein the storage devices comprise for this purpose separate vehicle-side storage areas or storage units and/or separate user-side storage units and/or vehicle-external storage units which are readable in different vehicles.

24. Arrangement according to claim 16, further comprising sensor devices for detecting one or several influential velocity variables, said velocity defining devices carrying out a recording of the relevant data and the defining of the desired velocity defining value and/or velocity defining limit value separately according to different classes of these influential variables.

25. Arrangement according to claim 24, wherein the velocity defining devices for defining the desired velocity defining value and/or the velocity defining limit value use an actual velocity value detected beforehand upon a driver's command for the corresponding vehicle position or the desired velocity value or the velocity limit value.

26. Arrangement according to claim 24, wherein the velocity defining devices use an actual velocity value last recorded for the corresponding vehicle position or a desired velocity value or limit velocity value for defining the desired velocity defining value and/or velocity defining limit value.

27. Arrangement according to claim 24, wherein the velocity defining devices contain devices for recognizing the condition of a free-road drive and use an actual velocity value last detected during a free-road drive for the corresponding vehicle position for defining the desired velocity defining value.

28. Arrangement according to claim 24, wherein the velocity defining devices use a definable percentage value from several actual velocity values detected beforehand for the corresponding vehicle position as a whole or only during a free-road drive, or desired velocity values or limit velocity values for defining the desired velocity defining value and/or velocity defining limit value.

29. Arrangement according to claim 24, wherein the velocity defining devices use defining values stored beforehand and/or defining values determined from road network data stored beforehand as long as no detected velocity data of previous drives are available in an evaluatable manner for the respective driving position, for defining the desired velocity defining value and/or velocity defining limit value.

30. Arrangement according to claim 24, wherein the velocity defining devices select the desired velocity defining value and/or velocity defining limit value according to a definable priority list from several rough defining values which they determine in parallel from road network data stored beforehand and/or from defining values explicitly stored beforehand.

* * * * *